(12) United States Patent
Vietzke et al.

(10) Patent No.: US 10,250,180 B2
(45) Date of Patent: Apr. 2, 2019

(54) HOLDING DEVICE FOR A SOLAR PANEL ON A PARAPET OF A BALCONY

(71) Applicant: INDIELUX UG (HAFTUNGSBESCHRANKT), Berlin (DE)

(72) Inventors: Marcus Vietzke, Berlin (DE); Fabian Friedrich, Berlin (DE)

(73) Assignee: INDIELUX UG (HAFTUNGSBESCHRÄNKT), Berlin (DE)

( * ) Notice: Subject to any disclaimer, the term of this patent is extended or adjusted under 35 U.S.C. 154(b) by 14 days.

(21) Appl. No.: 15/510,699

(22) PCT Filed: Sep. 14, 2015

(86) PCT No.: PCT/DE2015/100390
§ 371 (c)(1),
(2) Date: Mar. 13, 2017

(87) PCT Pub. No.: WO2016/037613
PCT Pub. Date: Mar. 17, 2016

(65) Prior Publication Data
US 2017/0264234 A1    Sep. 14, 2017

(30) Foreign Application Priority Data

Sep. 12, 2014 (DE) ........................ 10 2014 113 216

(51) Int. Cl.
*H02S 20/22* (2014.01)
*F24S 30/42* (2018.01)
(Continued)

(52) U.S. Cl.
CPC .............. *H02S 20/22* (2014.12); *F24S 20/62* (2018.05); *F24S 25/61* (2018.05); *F24S 25/632* (2018.05);
(Continued)

(58) Field of Classification Search
CPC . H02S 20/22; F24S 30/42; F24S 30/20; F24S 25/634; F24S 25/61; F24S 25/632;
(Continued)

(56) References Cited

U.S. PATENT DOCUMENTS 4,739,748 A * 4/1988 Stice .................. E06B 9/386
126/618
2014/0096463 A1 4/2014 Prentice

FOREIGN PATENT DOCUMENTS

AT          390824      7/1990
AT          513389      4/2014
(Continued)

*Primary Examiner* — Magali P Slawski
*Assistant Examiner* — Kourtney R S Carlson
(74) *Attorney, Agent, or Firm* — JMB Davis Ben-David

(57) ABSTRACT

The invention relates to a holding device (1) for a solar panel (2) on a parapet (3) of a balcony, said device having at least the following components: —a connection arrangement (4) for connecting an element to be held, wherein the connection arrangement has at least one support (5, 6, 7, 8) for placing on a parapet; and —at least one transverse strut (9, 10) for bridging a parapet width, wherein the at least one transverse strut is connected to the connection arrangement and has at least one flange (12, 13) for placing on a parapet, wherein by means of a movement of the at least one flange towards the connection arrangement, the at least one flange and the at least one support press in opposite directions against the parapet. The invention disclosed relates to a holding device which allows for greater flexibility with regard to the structure of a balcony parapet.

10 Claims, 6 Drawing Sheets

Figure 1:
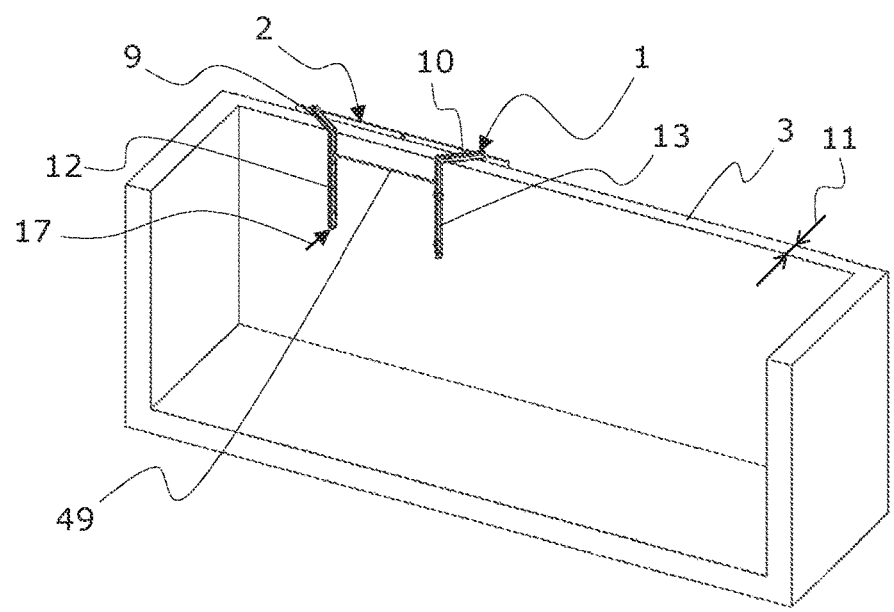

(51) Int. Cl.
*F24S 25/634* (2018.01)
*F24S 25/61* (2018.01)
*F24S 20/62* (2018.01)
*F24S 25/632* (2018.01)
*F24S 25/70* (2018.01)
*F24S 25/00* (2018.01)
*F24S 30/00* (2018.01)
*F24S 30/20* (2018.01)
*F24S 25/60* (2018.01)

(52) U.S. Cl.
CPC .............. *F24S 25/634* (2018.05); *F24S 25/70* (2018.05); *F24S 30/42* (2018.05); *F24S 30/20* (2018.05); *F24S 2025/012* (2018.05); *F24S 2025/6002* (2018.05); *F24S 2030/132* (2018.05); *F24S 2030/134* (2018.05); *Y02B 10/10* (2013.01); *Y02B 10/20* (2013.01); *Y02E 10/44* (2013.01); *Y02E 10/47* (2013.01)

(58) Field of Classification Search
CPC ...... F24S 25/70; F24S 20/62; F24S 2025/012; F24S 2025/6002; F24S 2030/134; F24S 2030/132
USPC ............. 136/242–265; 211/80, 87.01, 86.01, 211/88.03, 89.01, 96, 113, 116
See application file for complete search history.

(56) References Cited

FOREIGN PATENT DOCUMENTS

| | | |
|---|---|---|
| DE | 7708860 | 7/1977 |
| DE | 202010008495 | 12/2010 |
| DE | 202011102615 | 8/2011 |
| JP | 2006128573 | 5/2006 |

* cited by examiner

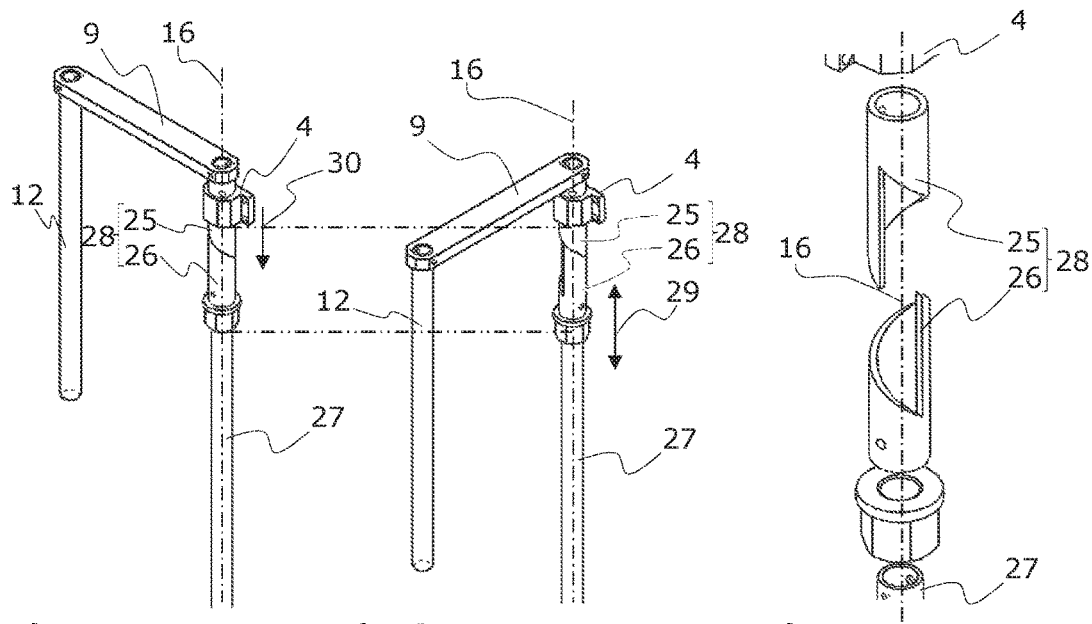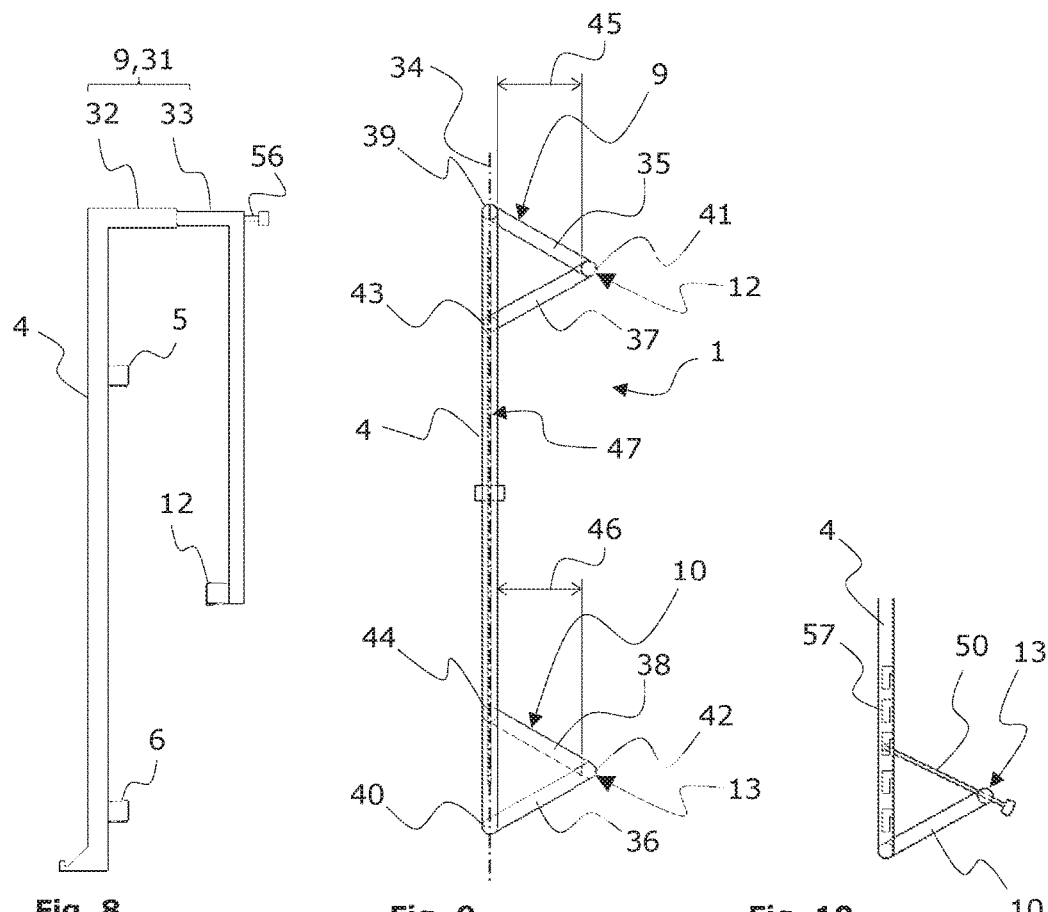

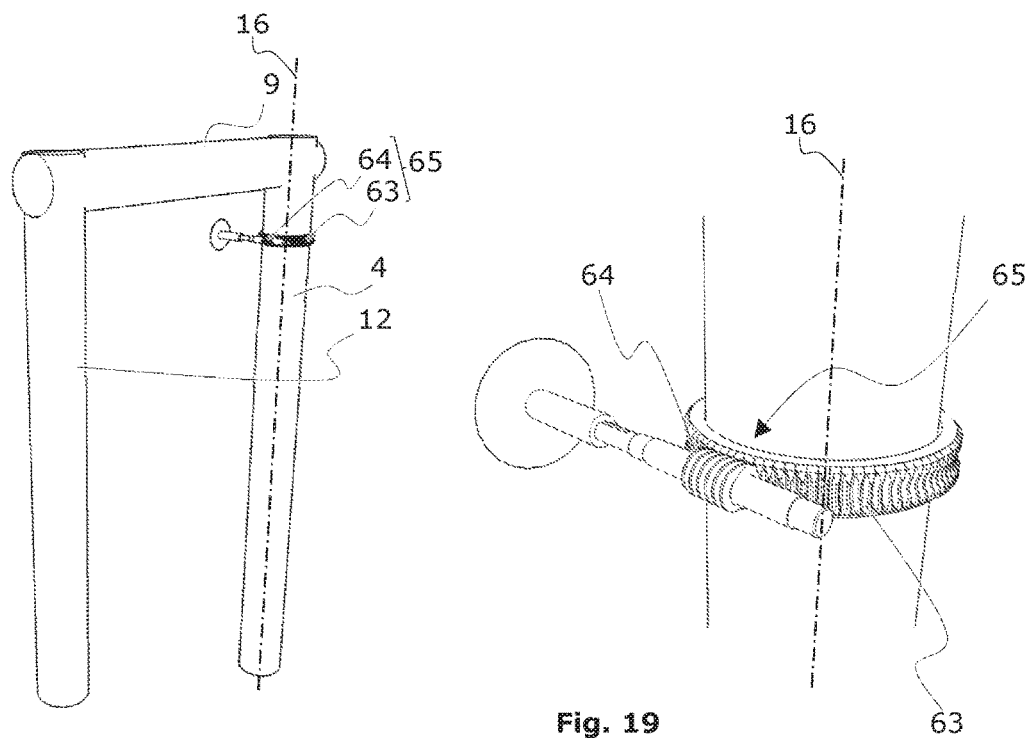
Fig. 18
Fig. 19
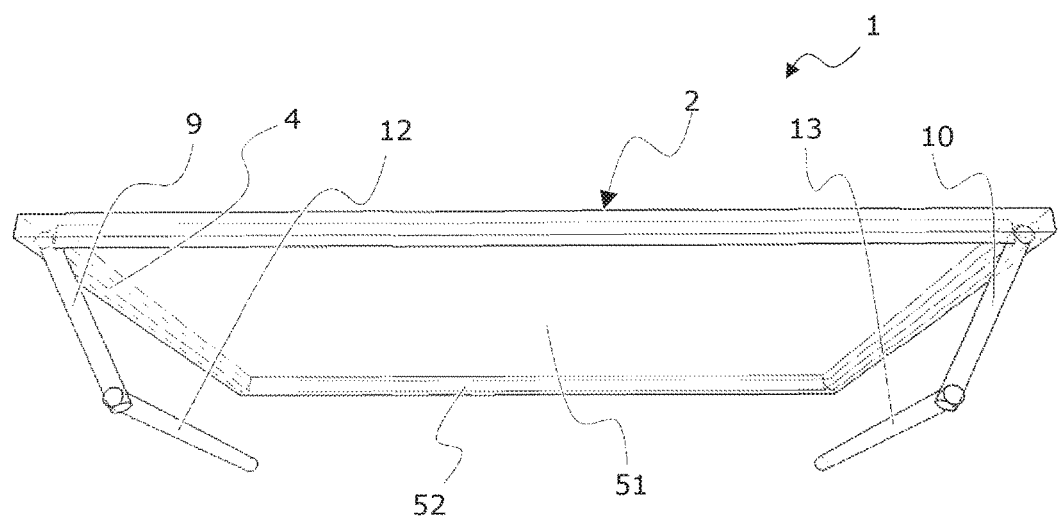
Fig. 20

HOLDING DEVICE FOR A SOLAR PANEL ON A PARAPET OF A BALCONY

CROSS-REFERENCE TO RELATED APPLICATIONS

This is the U.S. National Stage of International Application No. PCT/DE2015/100390 filed on Sep. 14, 2015, which was published in German under PCT Article 21(2), which in turn claims the benefit of German Patent Application No. 102014113216.5 filed on Sep. 12, 2014.

The present invention relates to a mounting device for a solar module on a railing of a balcony as well as a solar module comprising a mounting device.

Along with the increasingly more inexpensive and more efficient solar modules, particularly photovoltaic elements, there is an increasing desire to use a solar module for home supply. However, particularly in towns, only few people live in detached houses having an own roof area, and they are, furthermore, often tenants who do not wish to take building measures on the rented premises and who wish to take the solar module along when moving. As a potential attachment site the balcony, or its railing, have emerged. What is disadvantageous here is that the railings have very different dimensions. At the same time, however, a safe attachment has to be ensured which has to be realised without building measures, if possible.

The problems discussed here and relating to the known the state of the art are, at least partly, solved by the invention described below. The features of the invention emerge from the independent claims, advantageous embodiments of which are shown in the dependent claims. The features of the claims may be combined in any technically reasonable way, for which purpose the explanations from the following description as well as the features from the Figures comprising supplementary embodiments of the invention may also be included.

The invention relates to a mounting device for a solar module on a railing of a balcony comprising at least the following components:
  a tethering device for tethering an element to be supported, wherein the tethering device comprises at least one support to abut to a railing; and
  at least one cross bar for bridging a railing width, wherein the at least one cross bar is connected to the tethering device and comprises at least one flange to abut to a railing,
wherein the at least one flange and the at least one support press against the railing in opposed directions by means of a movement of the at least one flange towards the tethering device.

The mounting device is designed for permanently or temporarily mounting an element to be supported, particularly a solar module such as a photovoltaic element or a solar thermal element, a satellite signal receiver, a sunshade, an advertising panel or a table on a railing, preferably of a balcony. A railing, in this connection, is, for example, a wall, a railing, a balustrade, a railing covered by plate elements or façade elements or the like which is open work and/or massive. This mounting device is advantageous in that, on the one hand, it is mountable on a railing without building measures such as, for example, drilling, and therefore non-destructive and preferably not requiring particular technical skills. Above that, the mounting device is advantageous in that it can also be easily removed.

First, a tethering device is provided on which an element to be supported is fixedly mountable or which is integrally formed with the element to be supported. The tethering device is therefore provided with suitable support elements and fixing means according to the respective embodiment such as, for example, hook connectors, module fasteners, and/or threaded holes.

Furthermore, at least one cross bar, in many cases a pair of cross bars, is provided which has a sufficient length for most common railings. For example, a railing width of 1 cm [centimeters] up to 40 cm, preferably of 4 cm to 30 cm can be bridged. The at least one cross bar is, at that, movable so that the bridging length is (as precisely as possible) adjustable to the respective railing. The at least one cross bar is, at that, preferably designed so that the overall weight of the mounting device and the element to be supported is introduced into the railing via the cross bar, advantageously vertically. The cross bar is then the main support element of the mounting device. Alternatively (in addition), at least one (horizontal) holding flange is provided which introduces the overall weight into the railing. In another embodiment, at least part of the overall weight is introduced into the railing in a frictionally engaged manner by means of the at least one flange and the at least one support. The at least one support is, in one embodiment, formed as a point or small-area contact surface preferably comprising a preserver. In another embodiment, the mechanism for moving the flange which preferably extends across a major part of the element to be supported in a rod or pipe form, is, at the same time, used as the support. It is particularly preferable to use a frame element having a vertical main extension as the support. In case of a support having large dimensions, preferably a plurality of contact positions, particularly two for each support, are formed. However, additional supports may also be provided on the tethering device.

For applying a retention force for safeguarding, for example, against wind loads, and, depending on the embodiment, in addition to a frictionally engaged introduction of the overall weight, the pairing of at least one flange and at least one support is provided. The at least one flange can be brought in abutment with the railing by means of the movement of the cross bar, whereby, in turn, the at least one support on the opposite side of the railing is brought in abutment. Thus, a clamping force is applied to the railing which secures the element to be supported on the railing or, if required, additionally supports it. In other words, the at least one flange can be brought into a force-transmitting contact with the railing by means of a movement of the at least one associated cross bar towards the tethering device, the at least one support of the tethering device forming, together with the railing, a counter surface to the at least one flange, and forming a force-transmitting contact to the railing opposite to the flange.

In another embodiment, the flange is foldable relative to the cross bar and is connected to the tethering device by means of a threaded rod so that the flange is pulled against the railing by means of tightening the screw. In one embodiment for massive or concealed railings, the threaded rod is to be positioned above the railing in the final assembly.

The mounting device is therefore not only non-destructive and mountable without technical measures, but above that applicable to many different dimensions and forms of railings.

According to a further advantageous embodiment of the mounting device described above the at least one cross bar is pivotable about an axis parallel to the railing plane of a railing, and preferably a clamping force is applicable to the railing by means of the at least one flange in cooperation with the at least one support.

In this embodiment, the at least one flange is pivoted towards the tethering device by means of the associated cross bar to fasten the mounting device on the railing. This device has a very stable configuration of the cross bar and is easy to handle. In addition, this variation can be produced at low cost. The at least one cross bar is, in this connection, preferably pivotable towards the centre of the tethering device. In another embodiment, the cross bar is pivoted to the outside, a design having a particularly low overall depth being obtainable here. Preferably the cross bar is aligned about an axis along the earth's gravitational field.

In a preferred embodiment, the cross bar is connected to a setting piston in a rotationally fixed fashion, the setting piston being rotatable about a vertical axis relative to the tethering device. The setting piston, at that, preferably comprises a preferably pin-shaped guide element guidable by means of a swivel guide path. The swivel guide path preferably extends over an angle range of at least 45°, preferably up to 90°. For covering the widths of most railings, an angle range of 85° is preferable, the swivel guide path, at the same time, extending along the vertical axis. The setting piston, and with it the cross bar connected in a rotationally fixed manner, will therefore be rotated about the vertical axis in case of a vertical adjustment of the setting piston. The vertical adjustment is, for example, possible by means of a threaded rod or a screw.

According to a further advantageous embodiment of the mounting device described above, for pivoting the at least one cross bar, at least the following components are provided for each cross bar:
  a guide cylinder concentric with regard to the axis and comprising a swivel guide path, wherein the swivel guide path extends over an angle range of 45° to 90°, preferably 85°, and axially over a longitudinal section, wherein the associated cross bar is connected to the guide cylinder in a rotationally fixed manner;
  a longitudinal guide path formed in the tethering device, wherein the longitudinal guide path axially extends over the longitudinal section;
  a setting piston comprising a guide element, wherein the guide element extends into the swivel guide path and into the longitudinal guide path and thus limits a movement of the setting piston,
wherein the guide cylinder is rotatable relative to the tethering device by means of an axial movement of the setting piston.

The guide cylinder used here is rotatably connected to the tethering device and moves the cross bar including the flange towards the tethering device upon a rotation relative to the tethering device so that a clamping force is applicable to the railing by means of the flange and of the at least one support. To this end, the guide cylinder comprises a swivel guide path so that the guide cylinder rotates when the guide element is axially moved. To this end, the guide element is fixed in the or around the setting piston arranged in the guide cylinder, wherein the guide element is prevented from rotating relative to the tethering device via the longitudinal guide path in the tethering device. Here, the longitudinal guide path overlaps the swivel guide path, or is preferably coinciding with the axial extension so that the maximum rotation is attainable, and preferably overtwisting is prevented by the axial stop. In one embodiment, the longitudinal guide path is inclined opposite to the inclination of the swivel guide path, the relative angle between the swivel guide path and the longitudinal guide path preferably not being larger than 45° and furthermore preferably forming an upwards-facing V-shape in a pre-installation position (no clamping) of the cross bar.

Such an embodiment is particularly robust and easy to handle. Above that, the elements are self-retaining when turned and can therefore be implemented in a self-securing manner.

According to a further advantageous embodiment of the mounting device described above, a threaded rod is disposed in the guide cylinder, and the setting piston comprises a female thread, and the setting piston is axially shiftable by turning the threaded rod.

The embodiment suggested here enables an easy handling of the adjustment of the position of the at least one flanges to the respective railing. For example, a rotary knob enabling turning without a tool is provided on the threaded rod. This embodiment is therefore entirely mountable without tools. Above that, the thread can be configured so that the setting piston is locked in a set position in a self-retaining fashion. According to another aspect, the mounting device according to this embodiment can be adjusted so as to be particularly flat for transportation so that the mounting device can be transported at low cost.

According to a further advantageous embodiment of the mounting device described above, at least the following components are provided for each cross bar for pivoting the at least one cross bar:
  a first ramp element on the tethering device;
  a guiding rod concentric to the axis, wherein the guiding rod is connected to the cross bar in a rotationally fixed manner;
  a second ramp element corresponding to the first ramp element, wherein the second ramp element is connected to the guiding rod in a rotationally fixed manner, and wherein the first ramp element and the second ramp element form a superimposed ramp pairing,
wherein the guiding rod is rotatable about the axis by means of the superimposed ramp pairing by means of a relative axial movement between the first ramp element and the second ramp element, wherein the relative axial movement is preferably initiated by a weight force of the tethering element and/or of the element to be supported during the installation on a railing.

In this alternative embodiment for implementing the pivoting movement of the at least one cross bar a ramp pairing is used, wherein, preferably, one of the two ramps is axially movable with the aid of an initial load, for example, by means of a spring, or by means of a screwed connection. The relative axial movement is translated into a pivoting movement of the cross bar relative to the tethering device. In a preferred embodiment, the weight force of the tethering device and/or of the element to be supported is used. When placing the at least one cross bar on a railing, advantageously, a relative axial movement between the first ramp element (axially fixed by the tethering device) and the second ramp element (axially fixed by the associated cross bar) is initiated as a result of the weight force becoming effective now which is translated into a rotation of the associated cross bar due to the superimposed ramps. This embodiment as well does not require tools for installation, and can, in addition, be transported in a space-saving manner.

According to a further advantageous embodiment of the mounting device, the at least one cross bar is pivotable by means of a gearing in cooperation with a threaded worm gear.

According to this embodiment, a rotation of the cross bar is effected by pivoting with the aid of a gearing, for example, about a retaining rod or a retaining pipe of the tethering device to which the cross bar is attached in a rotationally fixed fashion. A threaded worm gear engages the gearing. The threaded worm gear is, for example, embodied by a screw, preferably a space-saving headless screw. Preferably, self-locking is achieved thereby. The gearing is, at that, preferably not designed so as to be circular, but only configured for the desired pivoting angle, and possibly, in addition, for space-saving storage.

According to a further advantageous embodiment of the mounting device described above, the at least one cross bar has at least one of the following features with the aid of which the at least one cross bar has a variable length:
- a sliding connection having an adjustable length between a first cross bar section and a second cross bar section;
- a multi-part cross bar foldable multiple times about a transverse axis aligned in parallel to a railing;
- a cross bar formed as a chain which is extensible in accordance with the required length and lockable with regard to the tethering device; and
- a parallelogram (53) formed of a first parallel bar (54) and a second parallel bar (55) which are pivotable in parallel about a transverse axis (34) arranged in parallel to a railing (3).

The sliding connection is, in a particularly advantageous fashion, formed by means of a telescopic arrangement of the first cross bar section and of the second cross bar section. The length adjustment can, in this case, be configured discretely via, for example, latching steps, or continuously, for example, by means of a screw connection. In this connection as well, an embodiment not requiring the use of tools is preferable, for example, by using a manually resettable, pre-loaded latching element or a screw knob.

The multiply foldable cross bar comprises a plurality of foldable members among which those extending beyond a respective railing are foldable against the inner surface of the railing. Here, the folding movement is, in a preferred embodiment, effected about a perpendicular vertical axis with respect to the railing plane, and the flange is connected so as to be directed downwards. In another preferred embodiment, the multiply foldable cross bar is foldable about a horizontal axis, and the at least one protruding foldable member forms the flange. In this version as well, an implementation without tools is possible. Preferably, the joints have at least two latched positions securing the alignment of the foldable members in the stretched out position and in the folded position.

The chain form of the at least one cross bar is preferably storable in an element of the tethering device, preferably in a frame. For an adjustment of the length of the cross bar, the chain is pulled out, and the flange is brought in abutment. It is particularly preferable that the chain elements are configured so as to have an angular, preferably rectangular cross section, and that the accommodation element encloses the chain in a correspondingly angular form. In this way, a lateral guiding effect is obtained which lends a sufficient transverse stability to the construction so that no additional securing element against transverse force loads needs to be provided. Preferably, the chain links are guided by a rail with the aid of a pin, the pin, at the same time, being the chain pin between two chain links. If the chain is drawn out the pin is either removed or can be moved along the pin axis as a pre-loaded element. Thus, at the same time, the position of the last chain link connection in the rail is secured. Alternatively or in addition, a latching mark is provided on the upper side of a single, preferably a respective chain link, which latching mark can be brought in engagement with the outlet for the stowed away chain and secures the adjusted length of the cross bar in this way when a force, preferably a weight force, is applied. In one embodiment, the flange is laterally pressed against the railing, wherein, preferably, furthermore, a setting element is provided by means of which an adjustment for a difference in length of, for example, a maximum of half a chain link length, is compensable. Alternatively the flange is tensioned downwards so that the required clamping force is generated by redirecting the chain. In one embodiment, the chain is composed of different individual links, preferably of outer links and inner links which alternate with each other. In this way, a particularly high stability is obtained.

In the embodiment comprising a parallelogram, the parallel bars are preferably pivoted by means of a threaded rod, wherein the threaded rod connects the flange or, as appropriate, a joint at the transition to the flange, to the tethering device so that the flange can be brought into abutment with the railing by rotating the threaded rod. Here, the transverse axis is preferably oriented horizontally in the final mounting position so that the mounting device has a small design height. However, it may also be oriented vertically or in an intermediate angular orientation.

According to a further advantageous embodiment of the mounting device described above, the at least one cross bar is composed of two articulated parts, namely a first bar and a second bar, wherein a first joint of the first bar and a third joint of the second bar are connectable to the tethering device, and wherein a second joint is connectable to the at least one flange, wherein the second joint is movable relative to the tethering device by changing a distance between the first joint and the third joint, wherein, preferably, the third joint is shiftable by means of a transverse threaded bar, wherein, particularly, at the same time, a second two-piece cross bar is preferably movable by means of the transverse threaded bar.

In this embodiment, the cross bar forms a triangular form, wherein the base is preferably disposed in parallel to the railing plane and to a plane of the element to be supported, and the legs extend over a railing, and the flange is disposed at its tip. Now, if the base is extended, the distance between the flange and the at least one support of the tethering device becomes shorter. The extension of the base is preferably accomplished by means of a threaded rod. It is particularly preferable that, in case of a plurality of such cross bars, the threaded rod for the cross bars is commonly used, respectively, so that a uniform adjustment to a railing is enabled. This is preferably implementable by means of counter-directional threads, for example, in the third joints. This embodiment is also mountable on a railing without tools. Self-locking of the device is also possible.

According to a further advantageous embodiment of the mounting device described above the mounting device comprises at least one of the following means for fixing the contact position:
- a locking device; and
- a tightening device for establishing a tension between the at least one cross bar and another component of the mounting device, preferably another cross bar.

For many applications, no additional restraint is required. In numerous cases, however, additional safety means are demanded by safety regulations. The safety devices can respectively be combined with the embodiments described above. For a pivoting device, for example, a saw tooth ratchet or a free wheel in the locking direction is advantageous in which a tooth pairing disposed on the circumference which is preferably spring-loaded or fixable by means of an eccentric lever engages and constrains or prevents a movement from the set position. In case of linear movements a rack in combination with a pre-loaded engagement lever being movable relative to it is advantageous.

In another variation. the flange or (close to the flange) the cross bar is held in the set position by means of a tightening device, for example, a steel cable or a threaded rod. The tightening device is preferably the only means for positioning the at least one flange. In a preferred embodiment, two flanges or (close to the flange) two cross bars are connected to each other by means of a tightening device so that they can no longer be removed from the set position without releasing the tightening device.

According to another aspect of the invention, a solar module to be attached to a railing of a balcony is suggested which comprises at least the following components:
- at least one solar element for converting incident solar radiation to usable energy;
- a frame for stabilising the solar element;
- a mounting device according to an embodiment of the above description for supporting the solar element, wherein the tethering device is preferably integrally formed with the frame.

The solar module is designed for the utilisation of incident solar radiation by human beings, for example, by means of a conversion of incident solar radiation into electric power or heat or warm water. To this end, the solar module has a surface area which is as large as possible, and it is therefore susceptible to wind. Therefore, it has to be ensured that the solar module remains in the predetermined place even during a storm, and that it, furthermore, exerts the lowest possible strain on a railing. This is achieved by a safe clamping by means of the mounting device according to one of the embodiments described above. In a particularly lightweight, safe and low-cost embodiment, the tethering device is integrally formed with the frame of the solar module. Above that, a particularly flat embodiment is enabled which can be transported at low cost.

Figure 2:
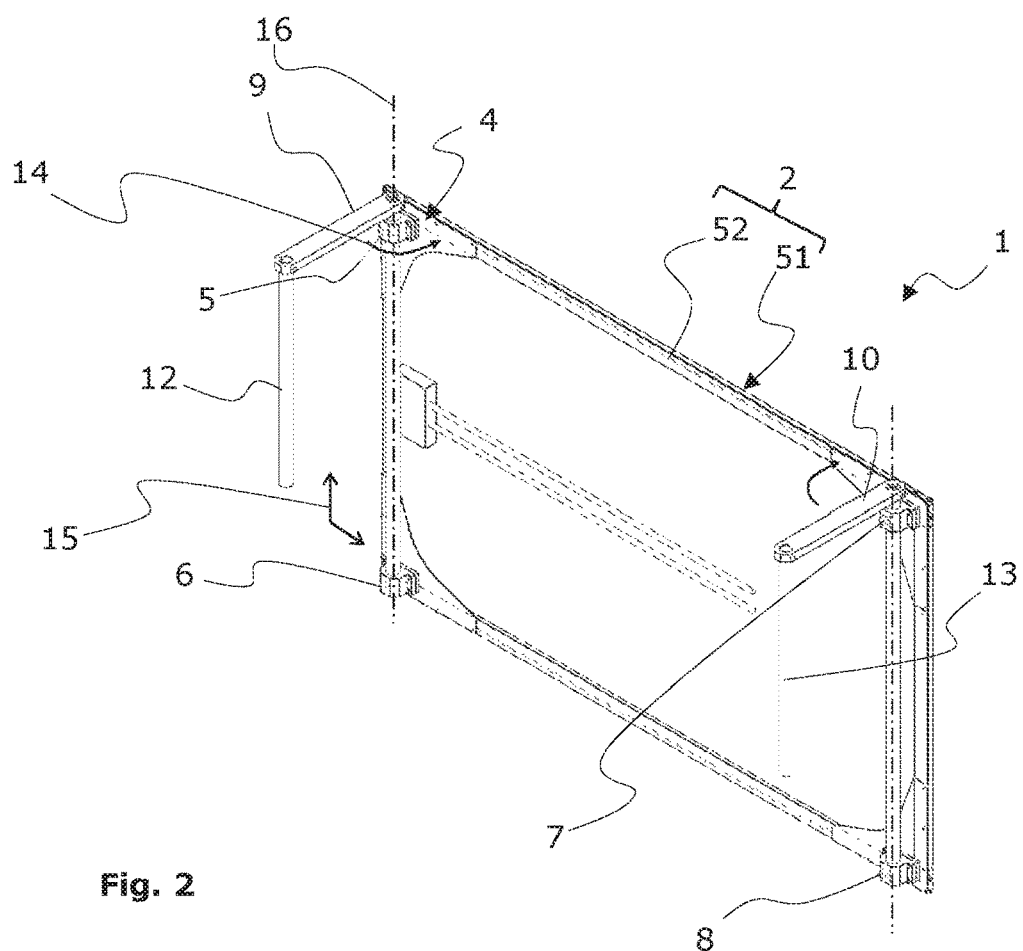
Figure 3:
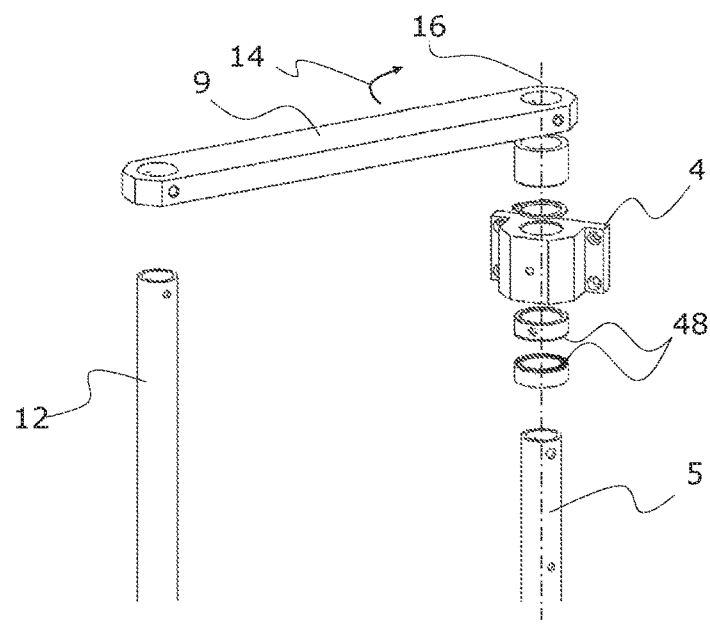
Figure 4:
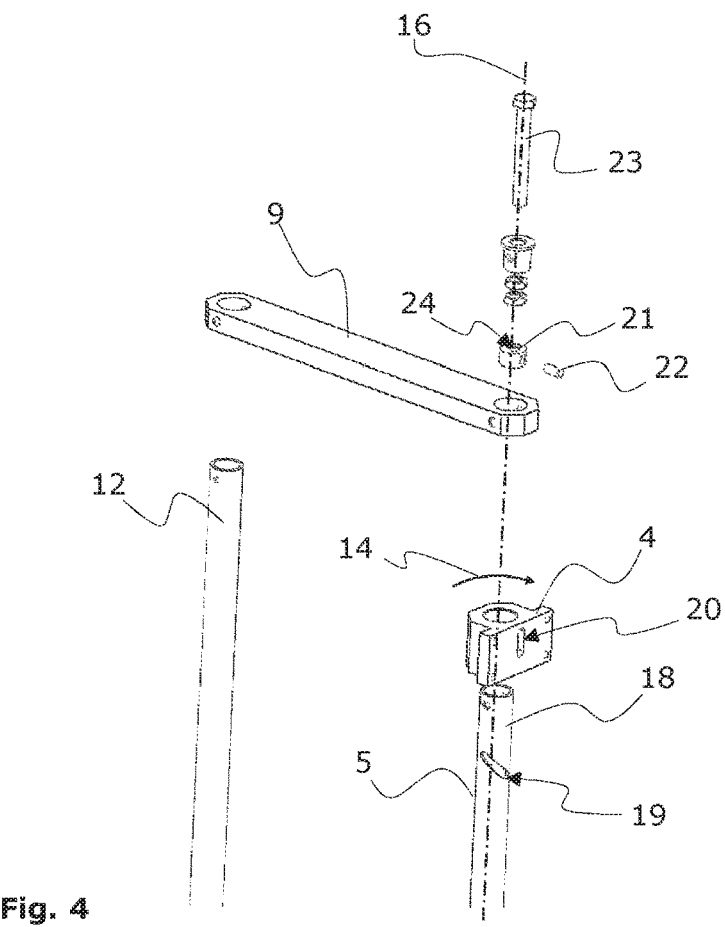
Figure 11:
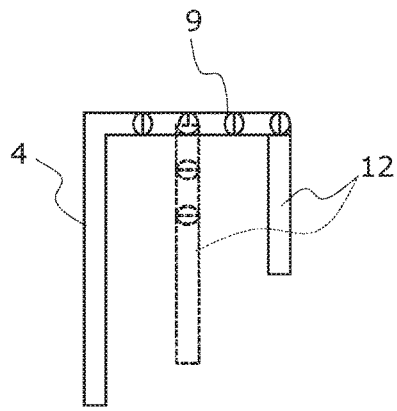
Figure 13:
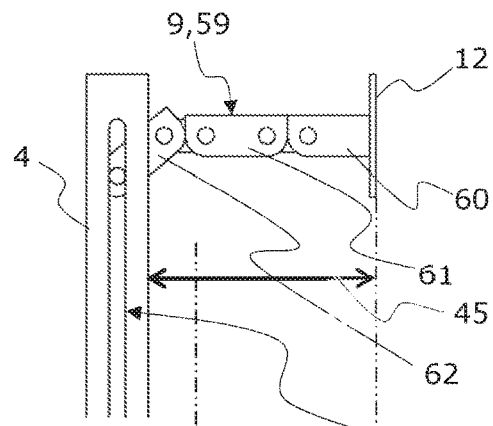
Figure 12:
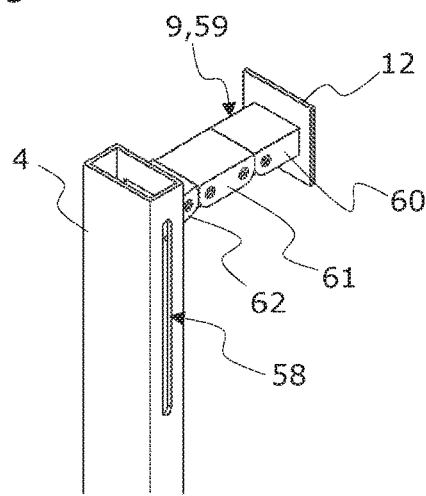
Figure 14:
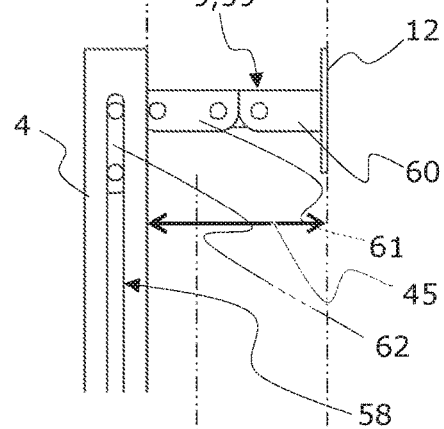
Figure 15:
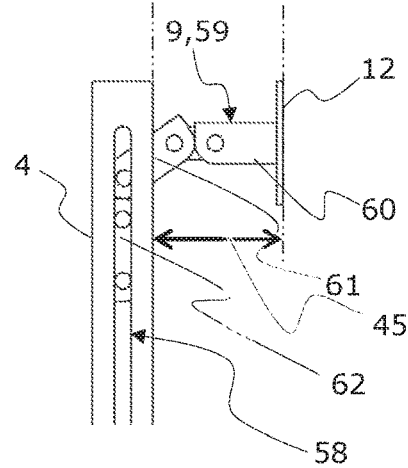
Figure 16:
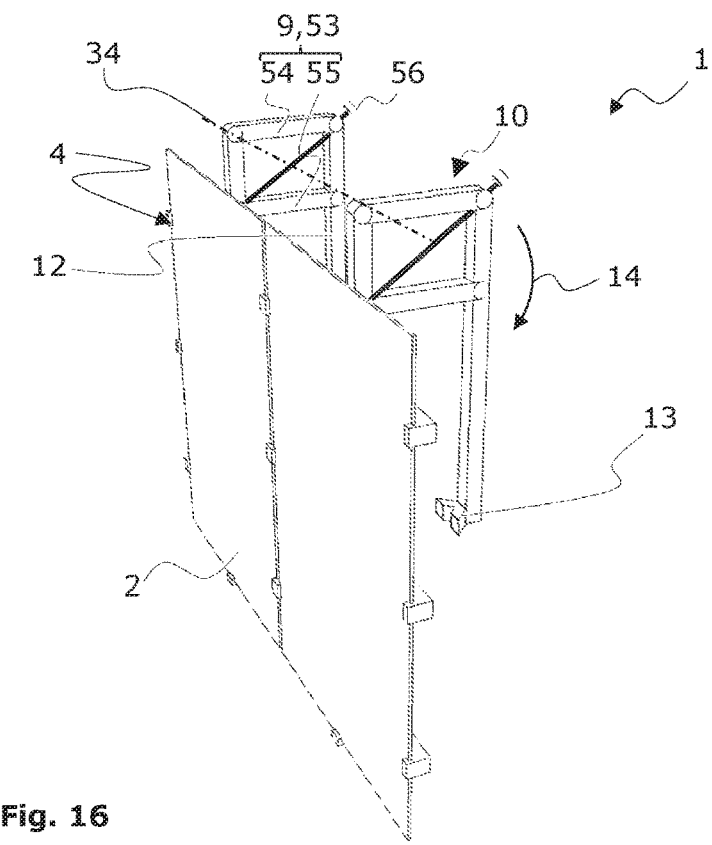
Figure 17:
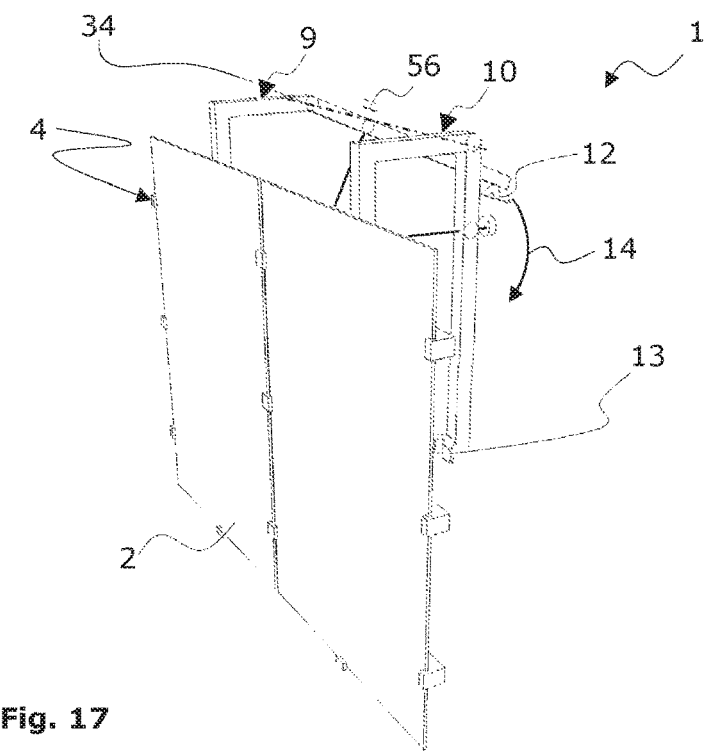

The invention described above will be explained in detail below against the related technical background with reference to the associated drawings showing preferred embodiments. The invention is in no way limited by the purely schematic drawings, in which context it has to be noted that the drawings are not dimensionally correct and not suitable for the definition of proportions. What is shown in FIG. 1: is a mounting device on a balcony having a massive railing;

FIG. 2: is a mounting device including a solar module;

FIG. 3: is a pivotable flange including an anti-twist protection;

FIG. 4: is a pivotable flange including a guide link;

FIG. 5: is a pivotable flange including a ramp pairing in a first position;

FIG. 6: is a pivotable flange including a ramp pairing in a second position;

FIG. 7: is a ramp pairing in an exploded view;

FIG. 8: is a cross bar including a sliding connection;

FIG. 9: is a pairing of two-part cross bars;

FIG. 10: is a cross bar including a tightening device and latching lugs;

FIG. 11: is a multiply foldable cross bar;

FIG. 12: is an isometric view of a cross bar formed as a chain;

FIG. 13: is a side view of a cross bar formed as a chain in a first position;

FIG. 14: is a side view of a cross bar formed as a chain in a second position;

FIG. 15: is a side view of a cross bar formed as a chain in a third position;

FIG. 16: is a mounting device including a solar module comprising cross bars formed as a parallelogram;

FIG. 17: is a mounting device including a solar module comprising flanges foldable about a transverse axis;

FIG. 18: is a cross bar pivotable by means of a worm drive;

FIG. 19: is a detailed view of a worm drive; and

FIG. 20: is an integrally formed mounting device in a frame of a solar module.

In FIG. 1, a balcony having a massive railing 3 is schematically shown on which a solar module 2 is mounted by means of a mounting device 1. The weight forces of the solar module 2 are mainly accommodated by the first cross bar 9 and the second cross bar 10. The support securing force, namely the clamping force 17, is introduced into the railing 3 by the first flange 12 and the second flange 13 as the antagonists of the at least one support (here concealed by the railing 3). In the present case, the flanges 12 and 13 are pivoted to the inside for this purpose. The pivoting angle of the cross bars 9 and 10 is determined depending on the railing width 11. In addition, the flanges 12 and 13 are secured by means of the first tightening device 49, or the clamping force 17 is generated by means of the first tightening device 49, wherein the first tightening device 49 is, for example, a threaded rod or a wire cable comprising a tightening element.

In FIG. 2, a mounting device 1 including a solar module 2 is shown which is composed of a solar element 51, for example, a photovoltaic plate, and a frame 52 which are, here, in the present form, integrally installed as a prefabricated member. In a preferred embodiment, the frame 51 is integrally formed with the tethering device 4 which is, here, screwed to the frame 52. Here, the flanges 12 and 13 are clampable to a railing 3 (comp. FIG. 1) by means of a movement 14 of the respective cross bars 9 and 10 about the axis 16 which is oriented vertically with respect to the railing plane 15, here to the inside. In this example, the pivot bearings of the cross bars 9 and 10 form the first support 5, the second support 6, the third support 7 and the fourth support 8.

In FIG. 3, a pivotable flange 12 comprising a cross bar 9 of a mounting device 1 is shown, for example, as in FIG. 2. Here, a locking device 48 is formed with a saw tooth gearing, i.e. as a free wheel securing a set angle of rotation along the movement 14 about the axis 16.

In FIG. 4 a further variation of the pivotable flanges 12 is shown in an exploded view along the axis 16 in which a guide cylinder 18 comprises a swivel guide path 19 covering an angle of about 90°. In the guide cylinder 18, a setting piston 21 is disposed which is guided by the swivel guide path 19 with the aid of a, here pin-shaped, guide element 22. The guide element 22, furthermore, extends into the longitudinal guide path 20 which extends, here vertically, i.e. parallel to the axis 16, along about the same longitudinal distance as the swivel guide path 19. Since the longitudinal guide path 20 is fixed in the tethering device 4, the guide element 22 is not rotatable about the axis 16. Consequently, the guide cylinder 18 rotates about the axis 16 and takes the cross bar 9 connected in a rotationally fixed manner along. For initiating the movement 14, a threaded rod 23 is operable which cooperates with a female thread 24 in the setting piston 21. In a preferred embodiment but not shown here, a (detachable) hand knob is provided instead of a hexagonal or other torque head of the threaded rod 23 which requires a tool.

In FIGS. 5 and 6, a similar configuration of a flange 12 and a cross bar 9 as shown in FIG. 4 is shown in a first position (FIG. 5) and in a second position (FIG. 6) turned with respect to it. A ramp pairing 28 of a first ramp element 25 disposed on a second ramp element 26 caters for a rotation about the axis 16. Either the (upper) first ramp element 25 moves down on the (lower) second ramp element 26 for turning, for example, due to the weight force 30, or, as shown here, the (lower) second ramp element 26 is held in the first position by means of an initial load (not shown here) and side tracks the turned first ramp element 25 along the relative axial movement 29 for the transfer into the second position. The guiding rod 27 is formed with the second ramp element 26 and the cross bar 9 in a rotationally fixed manner so that the flange 12 is turned in this way. In FIG. 7, an exploded view the ramp pairing 28 is shown to this end.

In FIG. 8, a cross bar 9 is shown in a side view as a sliding connection 31 comprising a first cross bar section 32 and a second cross bar section 33 which are shiftable into each other or out of each other by means of the adjusting screw 56. Thus, the supports 5 and 6 of the tethering device 4 and the flange 12, or the abutment element designated here, are moved towards each other, and a clamping force 17 can be applied to a railing 3 (compare FIG. 1).

In FIG. 9, a mounting device 1 is shown in a plan view in which two cross bars 9 and 10 are respectively temporarily provided by an outer first bar 35 or 36 and an inner second bar 37 or 38 which are connected to the tethering device 4 in an articulated manner. The first joint 39 or 40 is connected to the tethering device 4 so as not to be shiftable along the transverse axis 34. The third joint 43 or 44 is shiftably connected to the tethering device 4 and shiftable along the transverse axis 34 by means of the transverse threaded bar 47 here. In this way, the flange 12 or 13 which are hidden under the second joint 41 or 42 here, becomes movable towards the tethering device 4 so that the first distance 45 or the second distance 46 can be reduced and a clamping force 17 can be applied to a railing 3 in this way (compare FIG. 1). In this example, the cross bars 9 and 10, or the first bars 35 and 36 as well as the second bars 37 and 38, are synchronously movable by means of the common transverse threaded bar 47.

In FIG. 10 a simple variation is shown in which a flange 13 can be tightened to a railing 3 (compare FIG. 1) by means of a second tightening device 50 which can be fit into a latching lug 57 in the tethering device 4.

In FIG. 11, a multiply foldable cross bar 9 is shown by which a flange 12 can apply a clamping force to a railing 3 (compare FIG. 1) in cooperation with the tethering device 4. Potentially, further tightening elements are provided for this purpose.

In FIGS. 12 to 15, a cross bar 9 is formed as chain 59 and shown in different positions. The flange 12 is, here, only drawn as a placeholder and can therefore, for example, be embodied as a hook element for a railing hook or as a hook of the tethering device 4 (not shown) as well as as a fixing element to a floor segment. The first individual member 60, the second individual member 61 and the third individual member 62 which are shown here (more individual members are also possible) are guidable via a guiding rail 58 by means of chain pins (not shown). The distance 45 can be continuously or discretely set thereby.

In FIG. 16, a further variation of a mounting device 1 is shown in which the cross bars 9 and 10 are formed as parallelograms 53 (here, only the first cross bar 9 is provided with detailed numerals, and the second cross bar 10 has the same design). The (here two-part) solar module 2 is hinged to the tethering device 4 by means of hook elements here. The flanges 12 and 13 are movable about the transverse axis 34 by means of a movement 14 due to parallel tilting of the first parallel bar 54 and the second parallel bar 55 towards the tethering device. Here, this movement 14 is individually adjustable by means of the respective adjusting screw 56.

In FIG. 17, a further variation of the mounting device 1 similar to FIG. 16 is shown in which the cross bars 9 and 10 are rigidly connected to the tethering device 4. The flanges 12 and 13 are tiltable about a transverse axis 34 and can therefore be placed in a force transmitting contact to a railing 3 (compare FIG. 1). Here, the associated clamping force 17 is applied through the adjusting screw 56 which is also a tightening element here.

In FIG. 18, a cross bar 9 pivotable by means of a worm drive 65 and comprising a flange 12 is shown. The gearing 63 is disposed on the outside of an element of the tethering 4 rotatable about the axis 16 here. The threaded worm gear 64 is fixed against turning and drives the worm drive 65 so that the cross bar 9 is pivoted about the axis 16.

In FIG. 19, the worm drive 65 of FIG. 18 is shown in detail, wherein an advantageous self-locking gearing 63 was selected here.

In FIG. 20, an integrally formed mounting device 1 in a frame 52 of a solar module 2 comprising a solar element 51 is shown. The tethering device 4 is disposed in the frame 52 here. Therefore, this embodiment has a particularly flat design.

With the invention shown here, a mounting device having a great flexibility with regard to the quality of a balcony railing is suggested.

LIST OF NUMERALS 1 mounting device
2 solar module
3 railing
4 tethering device
5 first support
6 second support
7 third support
8 fourth support
9 first cross bar
10 second cross bar
11 railing width
12 first flange
13 second flange
14 movement
15 railing plane
16 axis
17 clamping force
18 guide cylinder
19 swivel guide path
20 longitudinal guide path
21 setting piston
22 guide element
23 threaded rod
24 female thread
25 first ramp element
26 second ramp element
27 guiding rod
28 ramp pairing 29 relative axial movement
30 weight force
31 sliding connection
32 first cross bar section
33 second cross bar section
34 transverse axis
35 first bar of the first cross bar
36 first bar of the second cross bar
37 second bar of the first cross bar
38 second bar of the second cross bar
39 first joint of the first cross bar
40 first joint of the second cross bar
41 second joint of the first cross bar
42 second joint of the second cross bar
43 third joint of the first cross bar
44 third joint of the second cross bar
45 first distance
46 second distance
47 transverse threaded bar
48 locking device
49 first tightening device
50 second tightening device
51 solar element
52 frame
53 parallelogram
54 first parallel bar
55 second parallel bar
56 adjusting screw
57 latching lug
58 guiding rail
59 chain
60 first individual member
61 second individual member
62 third individual member
63 gearing
64 threaded worm gear
65 worm drive

The invention claimed is:

1. A solar module (1,2) mounted on a railing (3) of a balcony comprising:
  at least one solar element (51) for converting incident solar radiation into usable energy;
  a frame (52) for stabilizing the solar element (51); and
  a mounting bracket for supporting the at least one solar cell element (51) comprising:
    a tethering device (4) for tethering the at least one solar cell element to be supported (2) and integrally formed with the frame (52), wherein the tethering device (4) comprises at least one support (5,6,7,8) for abutment to a railing (3); and
    two cross bars (9,10) for bridging a railing width (11), wherein the two cross bars (9,10) are connected to the tethering device (4) and wherein the two cross bars comprise a flange (12,13) each for abutment to a railing (3), wherein the respective flange (12,13) and the at least one support (5,6,7,8) press each other against the railing (3) in opposed directions by means of a movement (14) of the respective flanges (12,13) towards the tethering device (4), wherein the two cross bars are pivotable about a corresponding axis (16) parallel to the railing plane (15) of a railing (3), wherein the axes for each cross bar are spaced apart laterally.

2. The mounted solar module (1,2) according to claim 1, wherein a clamping force (17) is applicable to the railing (3) by means of the respective flange (12,13) in cooperation with the at least one support (5,6,7,8).

3. The mounted solar module (1,2) according to claim 2, wherein, for pivoting the two cross bars (9,10), at least the following components are provided for each cross bar (9,10):
  a guide cylinder (18) concentric to the respective axis (16) and comprising a swivel guide path (19), wherein the swivel guide path (19) extends over an angle range of 45° to 90°, preferably 85°, and axially over a longitudinal section, wherein the associated cross bar (9) is connected to the guide cylinder (18) in a rotationally fixed manner;
  a longitudinal guide path (20) formed in the tethering device (4), wherein the longitudinal guide path (20) axially extends over the longitudinal section; and
  a setting piston (21) comprising a guide element (22), wherein the guide element (22) extends into the swivel guide path (19) and into the longitudinal guide path (20) and limits a movement (14) of the setting piston (21) in this way,
wherein the guide cylinder (18) is rotatable relative to the tethering device (4) by means of an axial movement (14) of the setting piston (21).

4. The mounted solar module (1,2) according to claim 3, wherein a threaded rod (23) is disposed in the guide cylinder (18), and the setting piston (21) comprises a female thread (24), and the setting piston (21) is axially shiftable by rotating the threaded rod (23).

5. The mounted solar module (1,2) according to claim 2, wherein, for pivoting the two-one cross bars (9,10), at least the following components are provided for each cross bar (9,10):
  a first ramp element (25) on the tethering device (4);
  a guiding rod (27) concentric to the axis (16), wherein the guiding rod (27) is connected to the respective cross bar (9) in a rotationally fixed manner; and
  a second ramp element (26) corresponding to the first ramp element (25), wherein the second ramp element (26) is connected to the guiding rod (27) in a rotationally fixed manner, and wherein the first ramp element (25) and the second ramp element (26) form a superimposed ramp pairing (28),
wherein the guiding rod (27) is rotatable about the respective axis (16) by means of the superimposed ramp pairing (28) by means of a relative axial movement (29) between the first ramp element (25) and the second ramp element (26), wherein the relative axial movement (29) is preferably initiated by means of a weight force (30) of the tethering element (4) and/or of the at least one solar element to be supported (2) upon attachment to a railing (3).

6. The mounted solar module (1,2) according to claim 2, wherein the two cross bars (9) are pivotable by means of a gearing (63) in cooperation with a threaded worm gear (64).

7. The mounted solar module (1,2) according to claim 1, wherein the two cross bars (9,10) comprise at least one of the following features by means of which the two cross bars (9,10) have a variable length:
  a sliding connection (31) having an adjustable length between a first cross bar section (32) and a second cross bar section (33);
  a multi-part cross bar (9,10) multiply foldable about a transverse axis (34) oriented in parallel with respect to a railing (3);
  a cross bar (9) formed as a chain (59) which is extensible depending on the required length and lockable towards the tethering device (4); and a parallelogram (53) of a first parallel bar (54) and a second parallel bar (55) which are pivotable in parallel about a transverse axis (34) oriented in parallel with respect to a railing (3).

8. The mounted solar module (1,2) according to claim 2, wherein the two cross bars (9,10) are composed of two parts, namely a first bar (35,36) and a second bar (37,38), in an articulated fashion, wherein a first joint (39,40) of the first bar (35,36) and a third joint (43,44) of the second bar (37,38) is connectable to the tethering device (4), and wherein a second joint (41,42) is connectable to the respective flange (12,13), wherein the second joint (41,42) is movable relative to the tethering device (4) by means of changing a distance (45,46) between the first joint (39,40) and the third joint (43,44), wherein the third joint (43, 44) is preferably shiftable by means of a transverse threaded bar (47), wherein, particularly preferable, at the same time another two-part cross bar (10) is movable by means of the transverse threaded bar (47).

9. The mounted solar module (1,2) according to claim 1, wherein the mounting device (1) comprises at least one of the following means for fixing the mounted solar module in position:
   a locking device (48); and
   a tightening device (49,50) for establishing a tension between the two cross bars (9) and another component of the mounting device (1), preferably the another cross bar (10).

10. The mounted solar module (1,2) according to claim 1, wherein each cross bar has only a single flange.

* * * * *